(12) United States Patent
Shikada

(10) Patent No.: US 7,412,628 B2
(45) Date of Patent: Aug. 12, 2008

(54) STORAGE SYSTEM AND DISCONNECTING METHOD OF A FAULTY STORAGE DEVICE

(75) Inventor: Hirotaka Shikada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 509 days.

(21) Appl. No.: 10/737,567

(22) Filed: Dec. 16, 2003

(65) Prior Publication Data

US 2004/0172489 A1 Sep. 2, 2004

(30) Foreign Application Priority Data

Dec. 20, 2002 (JP) ............................. 2002-369410

(51) Int. Cl.
*G06F 11/00* (2006.01)
(52) U.S. Cl. .................. 714/43; 714/5; 714/8; 714/44; 714/56
(58) Field of Classification Search ..................... 714/5, 714/8, 43, 44, 56
See application file for complete search history.

(56) References Cited

U.S. PATENT DOCUMENTS

| 5,922,077 | A  | * | 7/1999 | Espy et al. ..................... 714/7 |
| 6,678,839 | B2 | * | 1/2004 | Mori ........................... 714/44 |
| 7,007,191 | B2 | * | 2/2006 | Riedl et al. .................... 714/4 |
| 2001/0011357 | A1 |   | 8/2001 | Mori |
| 2001/0014956 | A1 | * | 8/2001 | Nagata et al. ................... 714/8 |
| 2002/0002440 | A1 | * | 1/2002 | Sakai .......................... 702/35 |
| 2002/0012342 | A1 | * | 1/2002 | Oldfield et al. ............. 370/386 |
| 2003/0005352 | A1 | * | 1/2003 | Beer et al. ...................... 714/4 |

FOREIGN PATENT DOCUMENTS

| JP | 11-032068    | 2/1999  |
| JP | 11-353126    | 12/1999 |
| JP | 2000-187559  | 7/2000  |
| JP | 2001-007831  | 1/2001  |
| JP | 2001-043197  | 2/2001  |
| JP | 2001-086146  | 3/2001  |
| JP | 2001-167039  | 6/2001  |
| JP | 2001-216206  | 8/2001  |
| JP | 2001-306262  | 11/2001 |
| JP | 2001-337868  | 12/2001 |
| JP | 2002-007077  | 1/2002  |

* cited by examiner

*Primary Examiner*—Robert W Beausoliel, Jr.
*Assistant Examiner*—Joseph D Manoskey
(74) *Attorney, Agent, or Firm*—Greer, Burns & Crain, Ltd.

(57) ABSTRACT

A storage system in which a plurality of storage devices are connected by a pair of loops, disconnects a faulty storage device. The faulty storage device is disconnected from said loops by using, in conjunction, a first disconnect mode, in which a disconnect instruction is issued to a device control unit via a first path which connects controllers and device control units, and a second disconnect mode, in which a disconnect instruction is issued to a device control unit via a second path which connects loops connecting the plurality of storage devices, storage devices, and device control units. Even when a pair of connection ports of a storage device is abnormal, and even when the first path is abnormal, the faulty storage device can be disconnected reliably.

16 Claims, 17 Drawing Sheets

FIG. 10

| | FAULTY PORTION | SWITCH DISCONNECT CONTROL |
|---|---|---|
| A | (5)((7)) | ESI (OR DEI(1)) |
| | (6)((8)) | ESI (OR DEI(2)) |
| B | (1) (2) (6)((8)) | ESI |
| | (1) (5)((7)) | |
| | (1) (6)((8)) | |
| | (1) (2) (5)((7)) | |
| C | (5) (6) ((7)(8)) | DEI (1), (2) |
| | (5), (8) | |
| | (6), (7) | |

STORAGE SYSTEM AND DISCONNECTING METHOD OF A FAULTY STORAGE DEVICE

CROSS-REFERENCE TO RELATED APPLICATIONS

This application is based upon and claims the benefit of priority from the prior Japanese Patent Application No. 2002-369410, filed on Dec. 20, 2002, the entire contents of which are incorporated herein by reference.

BACKGROUND OF THE INVENTION

1. Field of the Invention

This invention relates to a storage system connected in a loop to a plurality of magnetic disks or other physical disks, and a disconnecting method of faulty storage device. In particular, this invention relates to a storage system and faulty storage device disconnecting method in which a faulty storage device in a loop is disconnected and bypassed.

2. Description of the Related Art

In a storage device that uses magnetic disks, magneto-optical disks, optical disks, or other storage media, the storage media is actually accessed at the request of a data processing device. When the data processing device uses a large volume of data, a storage system having a plurality of storage devices and control devices is employed.

In such a storage system, a redundant configuration is adopted in order to improve the reliability of stored data and device reliability, and a FC_AL (Fiber Channel Arbitrated Loop) interface is used for rapid data transfer. Numerous storage devices are connected to this FC_AL loop. Because of this, when a malfunction occurs in a storage device in the loop, the entire loop is affected. Consequently, technology to disconnect a malfunctioning storage device from the loop, and to eliminate the effect on the loop as a whole, is necessary.

In the prior art, two methods of disconnecting a malfunctioning storage device (magnetic disk device) from an FC_AL loop are known. FIG. 19 is a drawing that explains the first of these conventional technologies.

As shown in FIG. 19, each of the plurality of magnetic disk devices 160, 162, 164 is connected by fiber switches 130 to 134 and 140 to 144 to the pair of fiber channel loops 106 and 108. The fiber channel loop 106 is connected to the controller device adapter 102 by the fiber channel connector 114; the fiber channel loop 108 is connected to the controller device adapter 104 by the fiber channel connector 116.

Both device adapters 102, 104 are connected to the central control module 100 of the controller. Hence the central control module 100 can access each of the magnetic disk devices 160, 162, 164, using both one route (route a) via the device adapter 102 and fiber channel loop 106, and another route (route b) via the device adapter 104 and fiber channel loop 108.

A disconnecting control portion 150 and 152 are provided in each of the fiber channel loops 106, 108. The disconnect control portion 150 controls disconnect (bypassing) of each of the fiber switches 130, 132 and 134 of the fiber channel loop 106; the disconnect control portion 152 controls disconnect (bypassing) of each of the fiber switches 140, 142 and 144 of the fiber channel loop 108.

For example, as shown in FIG. 19, when the magnetic disk device 162 cannot be accessed via port a on the side of the fiber channel loop 106, a disconnect command is transmitted to the disconnect control portion 150 from port b on the side of the fiber channel loop 108, via the magnetic disk device 162.

By this means, the disconnect control portion 150 switches the fiber switch 132 on the side of port a of the magnetic disk device 162 to the bypass state as shown in FIG. 19, and disconnects the magnetic disk device 162 from the fiber channel loop 106. Thus the fiber channel loop 106 functions normally, and the magnetic disk device 162 can be accessed from port b on the side of the fiber channel loop 108.

FIG. 20 is a drawing which explains the second conventional technology. Similarly to FIG. 19, the central control module 100 accesses each of the magnetic disk devices 160, 162 and 164 by both one route (route a) via the device adapter 102 and the device channel loop 106, and by another route (route b) via the device adapter 104 and the fiber channel loop 108.

Switch control lines 118 and 120 are built on each of the fiber channel loops 106, 108, from each device adapter 102, 104, and each of the fiber switches 130 to 134 and 140 to 144 of the fiber channel loops 106 and 108 is controlled from the device adapters 102, 104 (for example, Japanese Patent Laid-open No. 2001-306292).

For example, as shown in FIG. 20, when port a on the side of the fiber channel loop 106 of the magnetic disk device 162 cannot be accessed, the fiber switch 132 on the port a side of the magnetic disk device 162 is switched to the bypass state as shown in FIG. 20 from the device adapter 102 via the switch control line 118, so that the magnetic disk device 162 is disconnected from the fiber channel loop 106. By this means, the fiber channel loop 106 functions normally, and the magnetic disk device 162 can be accessed from port b on the side of the fiber channel loop 108.

In case of the first conventional technology, when only one of the ports (for example, port a) is faulty as in FIG. 19, the one port (port a) of the magnetic disk device can be disconnected; but when both ports (port a and port b) are faulty, both ports cannot be disconnected, and so both fiber channel loops 106 and 108 can no longer operate, so that a system shutdown occurs.

In the case of the second conventional technology, so long as the switch control lines 118 and 120 are functioning normally, as shown in FIG. 20, any arbitrary faulty port can be disconnected; but if there is an abnormality (for example, a line break) in the switch connection lines 118, 120, none of the ports can be disconnected, the fiber channel loops 106, 108 can no longer operate, and a system shutdown may occur. Further, when the switch control lines 118, 120 are also being used as low-speed buses or for other uses, disconnect control requires time.

SUMMARY OF THE INVENTION

Hence an object of this invention is to provide a storage system and faulty storage device disconnecting method which can reliably disconnect the faulty port of a storage device from a loop, and enables prevention of system shutdown.

Another object of this invention is to provide a storage system and faulty storage device disconnecting method which can reliably disconnect a storage device from a loop, even when both ports of the storage device are faulty.

Still another object of this invention is to provide a storage system and faulty storage device disconnecting method which can reliably disconnect a faulty port of a storage device from a loop, even when an independent switch control line is abnormal.

Still another object of this invention is to provide a storage system and faulty storage device disconnecting method which can rapidly disconnect a faulty port of a storage device from a loop, even when both ports of the storage device are abnormal.

In order to achieve these objects, a storage system of this invention has a plurality of storage devices; at least one controller which controls the above plurality of storage devices; a pair of loops, wherein the information for exchange between the above controller and the above plurality of storage devices circulates in a single direction; a plurality of switches, provided in each of the above loops, to connect the above plurality of storage devices to the above pair of loops; and a pair of device control units, connected to the above controller by a first path, and moreover connected to the above storage devices by a second path, which operate the above plurality of switches. Further, the above controller has a first disconnect mode, in which a disconnect instruction is issued to the above device controller unit via the above first path, and a second disconnect mode, in which a disconnect instruction is issued to the above device controller unit via the above loops, the above storage device, and the above second path; the above first disconnect mode and the above second disconnect mode are used in conjunction to disconnect the above faulty storage device from the above loops.

Further, a disconnecting method of this invention is a method to disconnect a faulty storage device in a storage system for accessing a plurality of storage devices connected to a pair of loops according to a data access request from a request device, and has a step of issuing a disconnect instruction from a controller to a pair of device control units which operate a plurality of switches to connect the above plurality of storage devices to the above pair of loops, and a step of disconnecting a faulty storage device from the above loops by using in conjunction a first disconnect mode for issuing a disconnect instruction to the above device control units via a first path connecting the above controller and the above device control units, and a second disconnect mode for issuing a disconnect instruction to the above device control units via the above loops, the above storage devices, and a second path connecting the above storage devices and the above device control units.

In this invention, a first disconnect mode, in which a disconnect instruction is issued to the device control units via a first path connecting the controller and the device control units, and a second disconnect mode, in which a disconnect instruction is issued to the device control units via a loop connecting the plurality of storage devices and a second path connecting the storage devices and the device control units, are used in conjunction to disconnect the above faulty storage device from the above loops, so that even if there are abnormalities in the pair of connection ports of a storage device, and even if the first path is abnormal, the faulty storage device can reliably be disconnected.

Further, disconnect can be performed using the first path, which is slow, and the second path, which is fast, so that even in a large-capacity system in which numerous (for example, several hundred) storage devices are connected, rapid disconnect control is possible.

Further, in this invention it is preferable that the above controller executes disconnect in the above second disconnect mode when disconnect of the above faulty storage device in the above first disconnect mode fails. By this means, even when there is an abnormality in the pair of connection ports of the storage device, and even when the first path is abnormal, disconnect of the faulty storage device can be reliably performed.

Further, in this invention it is preferable that the above controller executes disconnect in the above first disconnect mode when disconnect of the above faulty storage device in the above second disconnect mode fails. By this means, even when there is an abnormality in the pair of connection ports of the storage device, and even when the second path is abnormal, disconnect of the faulty storage device can be performed reliably.

Further, in this invention it is preferable that the above controller employs the above first disconnect mode to put all switches in the above loops into the bypass state, and also put switches for the above storage devices having the above second path into the above loop-connection state, before executing disconnect in the above second disconnect mode. By this means, disconnect can be performed using the slow first path and the fast second path, so that even in a large-capacity system in which numerous (for example, over one hundred) storage devices are connected, rapid disconnect control is possible.

Further, in this invention it is preferable that the above controller have a channel circuit, for control of the interface with the above request device; a device circuit, which exchanges information with the above storage devices via the above loops; a central control unit, to control the above channel circuit and the above device circuit, and to access the above storage devices in response to data access requests from the above request device; and a service processor, connected to the above central control unit, which connects the above device control unit using the above first path. By this means, the load is distributed, disconnect control can be performed, and rapid disconnect is possible.

Further, in this invention it is preferable that the above device control unit performs state monitoring of the above plurality of storage devices, and utilizes the above first path to notify the above service processor of states. Because the first path is used for state monitoring, monitoring is easily accomplished, and cost increases are suppressed.

Further, in this invention it is preferable that the above controller be configured using a pair of the above controllers, and that each of the above controllers accesses the above storage devices via the above pair of loops. By this means, advantageous results are obtained from redundancy of disconnect.

Further, in this invention it is preferable that a third path connecting the above pair of device control units be provided, and that the above disconnect instructions be exchanged between the above pair of device control units. By this means, diversification of disconnect modes is possible.

BRIEF DESCRIPTION OF THE DRAWINGS

FIG. 10 is a drawing of the relation between the fault location of FIG. 9 and disconnect control;

DESCRIPTION OF THE PREFERRED EMBODIMENTS

Hereinafter, embodiments of this invention are explained, including in order a storage system, a disconnect control method, another disconnect control method, and another embodiment.

Storage System

Figure 1:
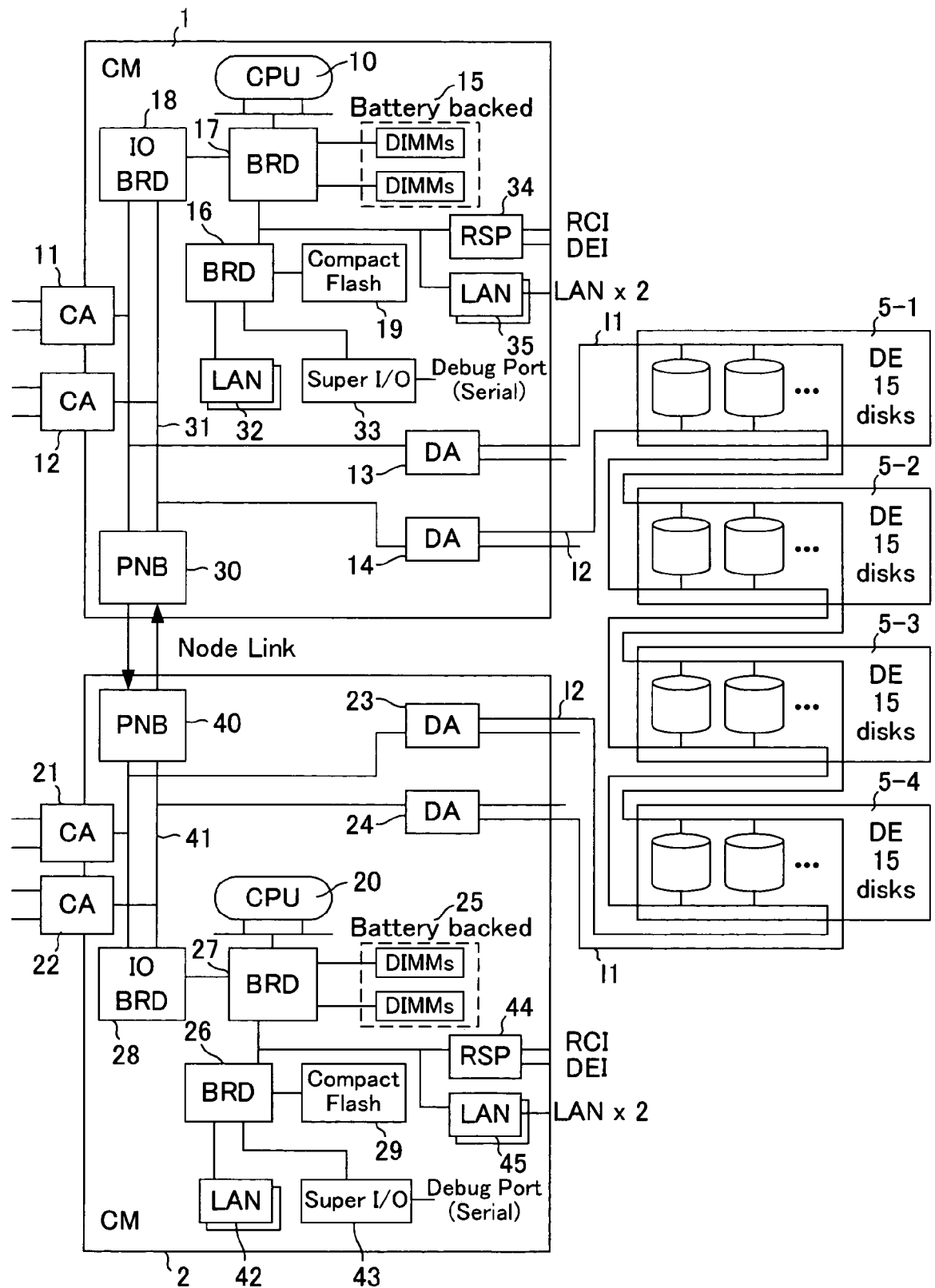
FIG. 1 is a drawing of the configuration of the storage system of one embodiment of this invention.

FIG. 1 is a drawing of the configuration of the storage system of one embodiment of this invention, showing a RAID (Redundant Arrays of Inexpensive Disks) system using magnetic disks. As shown in FIG. 1, the storage system comprises a pair of magnetic disk controllers (hereafter called "controllers") 1 and 2, and a plurality of device enclosures 5-1 to 5-4, including a plurality of magnetic disk devices connected to these controllers 1, 2 by fiber channel loops 11, 12.

In this storage system, the controllers 1, 2 are connected either directly or via network equipment to a host or server, and the system can perform rapid random-access reading and writing of large amounts of host or server data on RAID disk drives (magnetic disk devices).

The pair of controllers 1, 2 have the same configuration, comprising function modules CA (Channel Adapters) 11, 12, 21, 22, CM (Centralized Modules) 10, 15 to 19, 32 to 35, 20, 25 to 29, and 42 to 45, and DA (Device Adapters) 13, 14, 23, 24.

CA (Channel Adapters) 11, 12, 21, 22 are circuits which govern control of the host interface for connection to the host, and comprise, for example, a fiber channel circuit (FC), DMA (Direct Memory Access) circuit, and similar. DA (Device Adapters) 13, 14, 23, 24 are circuits which exchange commands and data with disk devices in order to implement an external interface with physical devices (hard disk drives), which are low-level devices, and comprise, for example, a fiber channel circuit (FC), DMA circuit, and similar.

CM (Centralized Modules) have CPUs 10, 20; bridge circuits 17, 27; memory (RAM) 15, 25; and IO bridge circuits 18, 28. The memory 15, 25 are provided with a battery backup, and are used as the work area of the CPUs 10, 20; in addition, a portion is used as cache memory.

The CPUs 10, 20 are connected via the bridge circuits 17 and 27 to the memory 15, 25, IO bridge circuits 18, 28, and second bridge circuits 16, 26. The second bridge circuits 16, 26 are connected to compact flash memory 19, 29, which stores programs. (OS, various firmware) for execution by the CPUs 10, 20, to flash memory 32, 42, which stores the BIOS (Basic Input/Output System), and to serial ports 33, 43 for use in debugging. The CPUs 10, 20 execute these programs, and also execute read/write processing, RAID management processing, and similar.

The bridge circuits 17, 27 are connected to the RSPs 34, 44 and the LAN ports 35, 45. The RSPs (Remote Service Processors) 34, 44 are modules which support the storage system, and execute maintenance functions via the RCI (Remote Control Interface) bus, perform UPC functions via the DEI (Device Enclosure Interface) bus described in detail in FIG. 2 to control the power turn-on sequence when the power supply is turned on and off, and perform temperature monitoring functions to monitor temperature sensors installed within the device enclosures 5-1 to 5-4.

The PCI (Peripheral Component Interconnect) bus 31 connects the CAs 11, 12, 21, 22 and the DAs 13, 14, 23, 24, and also connects the CPUs 10, 20 and memory 15, 25 via the IO bridge circuits 18, 28. The PCI bus 31 is also connected to the PCI-node link bridge circuits (PNBS) 30, 40.

The PCI-node link bridge circuit 30 of the controller 1 is connected to the PCI-node link bridge circuit 40 of the controller 2, and exchanges commands and data between the controllers 1 and 2.

In this storage system, the controller 1 is in charge of, for example, the magnetic disk devices in the device enclosures 5-1 and 5-2, and the controller 2 is in charge of the magnetic disk devices in the device enclosures 5-3 and 5-4. For example, in FIG. 1, the magnetic disk devices of the device enclosures 5-1 and 5-2, and the magnetic disk devices of the device enclosures 5-3 and 5-4, are configured in a RAID 5.

The cache memory within the memory 15, 25 respectively stores a portion of the data of the disk devices of which the controller is in charge, and stores write data from the host. The CPUs 10, 20 receive read requests from the host via the CAs 11, 12, 21, 22, reference the cache memory, judge whether a physical disk must be accessed, and if necessary, issue disk access requests to the DAs 13, 14, 23, 24. Also, the CPUs 10, 20 receive write requests from the host, write the write data to cache memory, and issue requests for any internally scheduled write backs or other processing to the DAs 13, 14, 23, 24.

Figure 2:
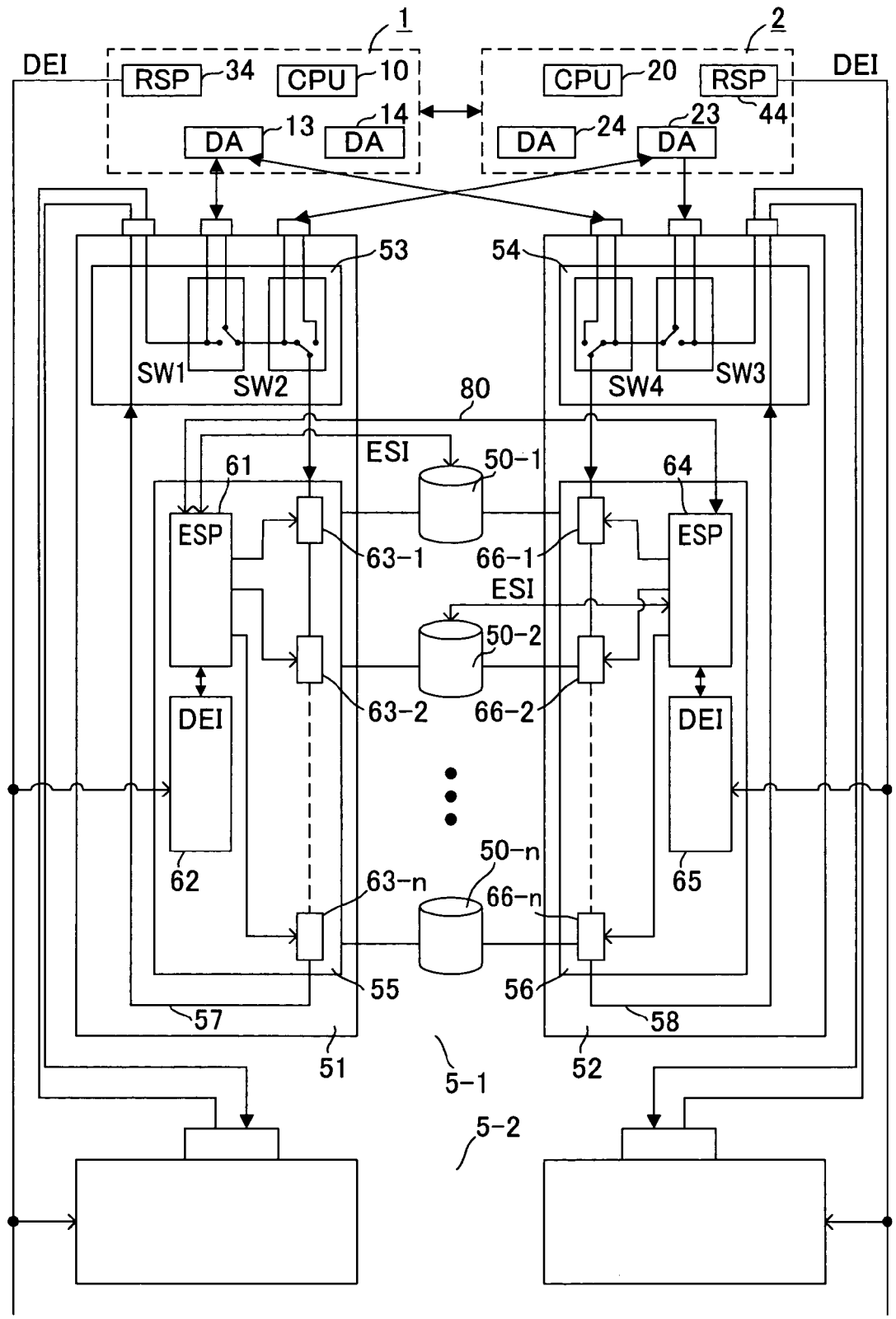
FIG. 2 is a drawing of the configuration of the device enclosure of FIG. 1.
Figure 3:
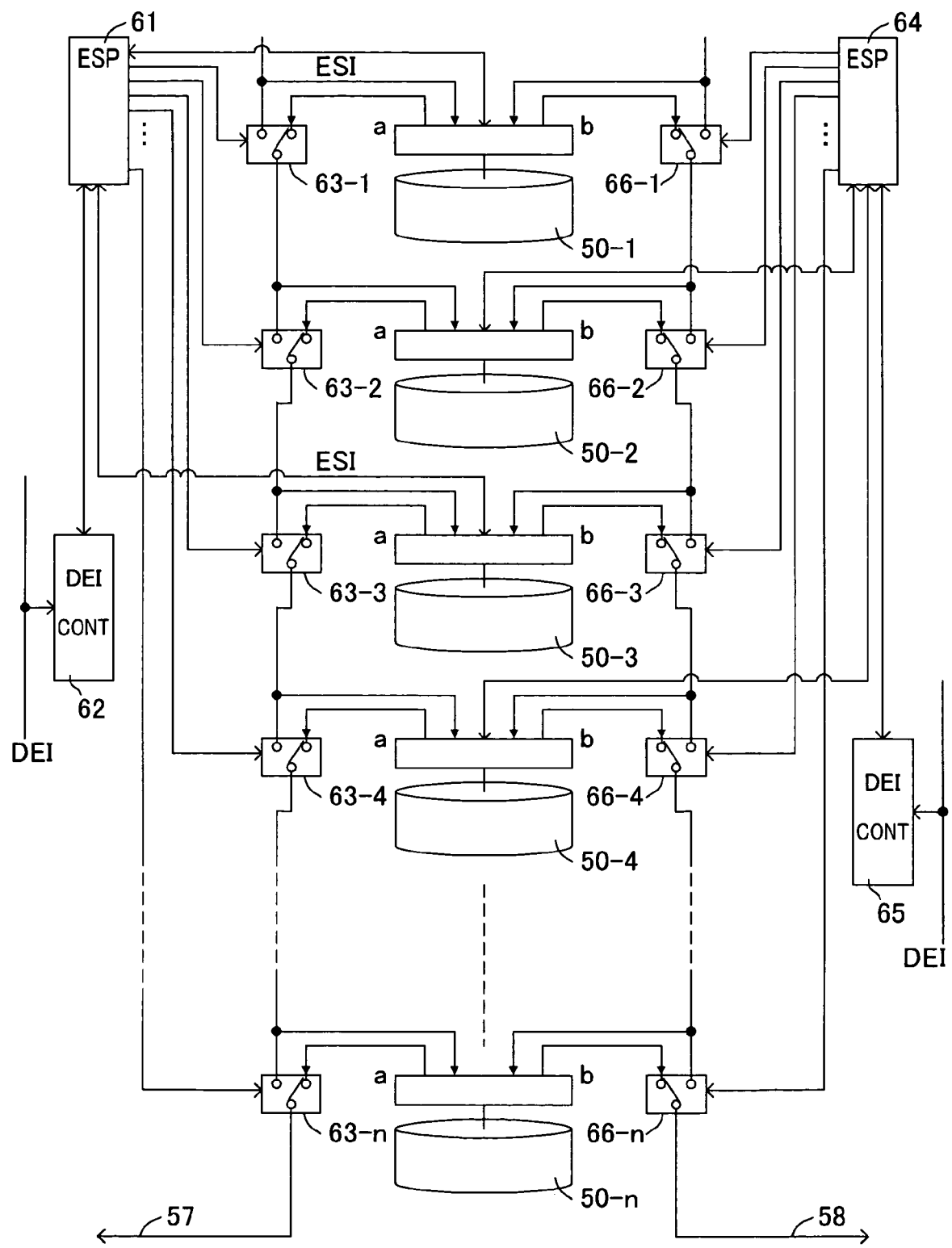
FIG. 3 is a detailed drawing of the device enclosure of FIG. 2.

FIG. 2 and FIG. 3 are drawings of the configuration of the device enclosures 5-1 to 5-4 of FIG. 1. As shown in FIG. 2 and FIG. 3, each of the magnetic disk devices (storage devices) 50-1 to 50-n is connected, via port a and port b, to a pair of PBC (Port Bypass Circuit) modules 51, 52.

The PBC modules 51, 52 respectively have hubs 53, 54, PBCs (Port Bypass Circuits) 55, 56, and FC_ALs (Fiber Channel Arbitrated Loops) 57, 58. The hubs 53, 54 each have three input/output ports, and also have monitor function switches SW1, SW2 and SW3, SW4 respectively, which monitor whether a signal transmitted by a cable connected to each of the ports is valid; if the transmitted signal is valid, the switch automatically connects the FC_AL 57, 58 within the device enclosure.

The PBCs (Port Bypass Circuits) 55, 56 respectively have switches for FC drive connection 63-1 to 63-n and 66-1, to 66-n, ESPs (Enclosure Service Processors) 61 and 64, and DEI control circuits 62, 65. The switches for FC drive connection 63-1 to 63-n are inserted into the FC_AL 57, and connect to or bypass the ports a of the magnetic disk devices 50-1 to 50-n, as shown in FIG. 3.

The switches for FC drive connection 66-1 to 66-n are inserted into the FC_AL 58, and connect to or bypass the ports b of the magnetic disk devices 50-1 to 50-n, as shown in FIG. 3.

The ESPs (Enclosure Service Processors) 61, 64 monitor the states of magnetic disk devices, monitor degradation, and also perform connection and bypass control for the switches for FC drive connection 63-1 to 63-n and 66-1 to 66-n. The ESPs 61, 64 are connected to two magnetic disk drives within the device enclosure 5-1 by the ESI (Enclosure Service Interface). The ESI (Enclosure Service Interface) is an interface by which the controllers 1, 2 access the ESPs 61, 64 via magnetic disk drives within the FC_AL.

The DEI control circuits 62, 65 are connected to the DEI (Device Enclosure Interface) bus and to the ESPs 61, 64, and comprise a DEI communication circuit. The DEI is an interface for control of power supply turn-on/turn-off of the device enclosures of the RSPs 34, 44, and for device monitoring.

As shown in FIG. 3, the magnetic disk drives 50-1 to 50-n each have a port a for connection to the FC_AL 57, and a port b for connection to the FC_AL 58. Also, among the n (for example, 15) magnetic disk drives, the two magnetic disk drives 50-1 and 50-3 are connected to the ESP 61 by the ESI, and the two magnetic disk drives 50-2 and 50-4 are connected to the ESP 64 by the ESI.

The ESI (Enclosure Service Interface) is an interface through which the controllers 1 and 2 access the ESPs 61 and 64 via an FC_AL through magnetic disk drives. Hence, for example, the ESI enables access from the FC_AL 58 of the ESP 61 on the port a side via port b of the magnetic disk drive 50-1 (or 50-3). Similarly, the ESI enables access from the FC_AL 57 of the ESP 64 on the port b side via port a of the magnetic disk drive 50-2 (or 50-4).

Each of the ESPs 61 and 64 have two ESIs for redundancy., and are configured such that even if there is an abnormality in one ESI route, access through the other ESI route is possible.

In this invention, this ESI control route and a control route employing DEI can be used in conjunction to operate the FC_AL connection switches 63-1 to 63-n and 66-1 to 66-n for the purpose of disconnect from an FC_AL of a faulty storage device, executed by an ESP 61 or 64; consequently, reliable disconnect is possible regardless of the fault location.

Disconnect Control

Figure 4:
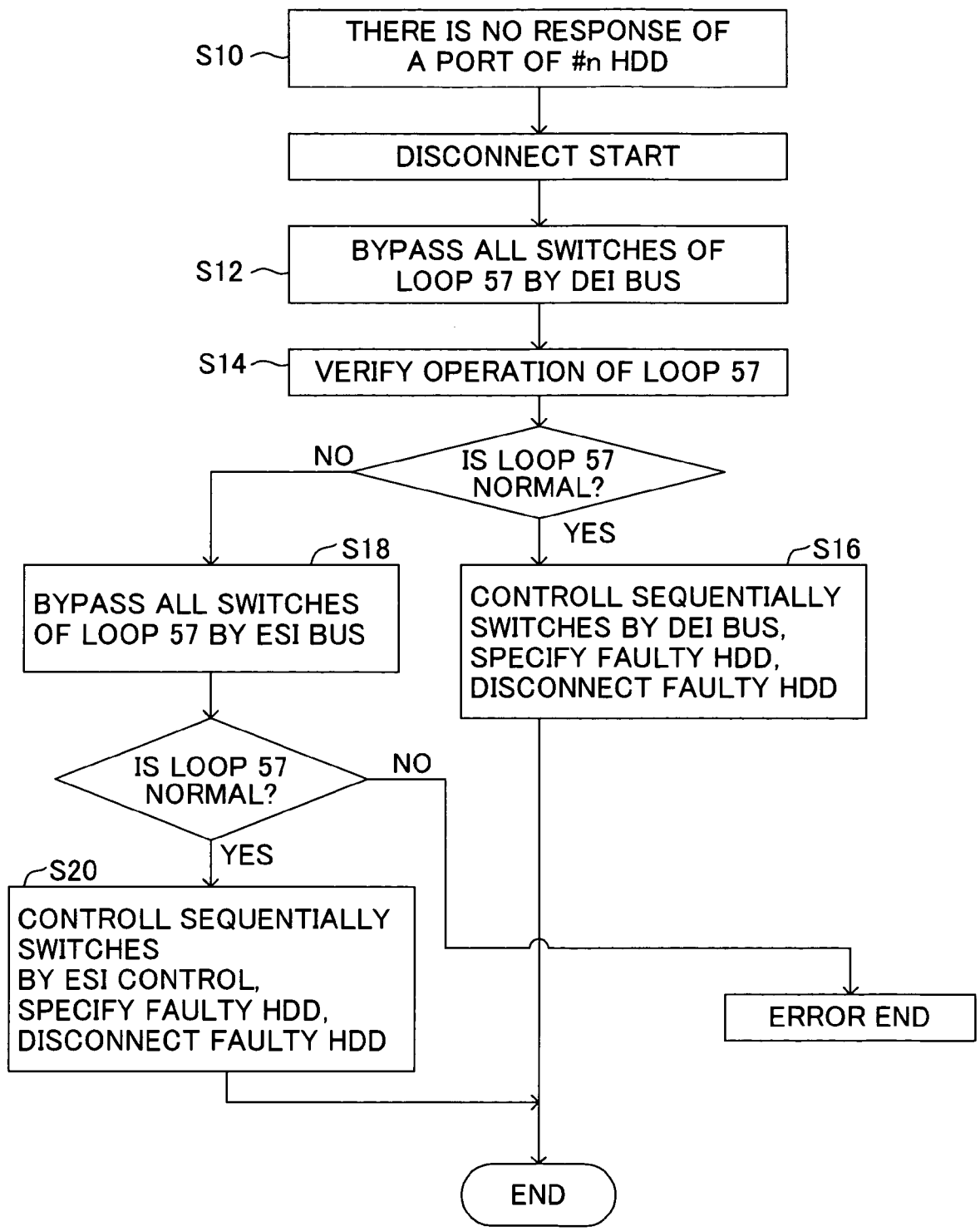
FIG. 4 is a diagram of the disconnect processing flow in one embodiment of this invention.

Next, disconnect control in one embodiment of this invention is explained, referring to FIG. 4 through FIG. 13. FIG. 4 is a diagram of the disconnect control flow in one embodiment of this invention; FIG. 5 through FIG. 8 are drawings explanation the operation thereof. The control flow of FIG. 4 is explained referring to FIG. 5 through FIG. 8.

Figure 5:
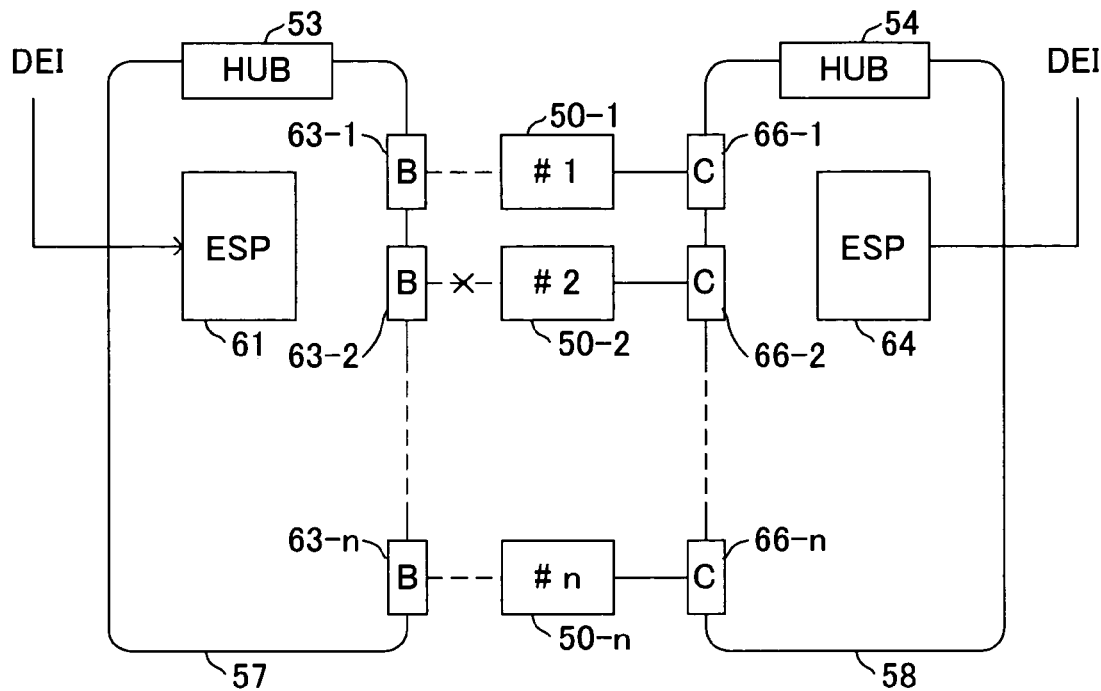
FIG. 5 is a drawing explaining a loop bypass state in FIG. 4.

(S10) In access of port a (FC_AL 57) of the #n magnetic disk drive (HDD), when there is no response from HDD #n, the CPU 10 of the controller 1 initiates disconnect processing. For example, if port a of drive 50-2 in FIG. 5 is faulty, in addition to drive 50-2, there is also no response even when accessing drives 50-3 through 50-n below drive 50-2.

(S12) The CPU 10 issues a bypass instruction for all switches from the RSP 34 to the DEI bus. If the DEI bus is operating normally, the bypass instruction is received from the DEI bus by the DEI control circuit 62 (see FIG. 2 and FIG. 3), and then is notified to the ESP 61. The ESP 61 switches all the FC_AL connection switches 63-1 to 63-n of the FC_AL 57 to the bypass state. In FIG. 5, the bypass state is indicated as a dashed line connecting the ports a, and indicated by "B", of each of the switches 63-1 to 63-n.

(S14) Next, the CPU 10 issues a bypass confirmation signal from the DA 13 to the hub 53 of the FC_AL 57, and verifies that the signal returns from the FC_AL 57 via DA 13. That is, the loop bypass is verified.

(S16) When the FC_AL 57 loop bypass is verified, then the DEI bus and loop itself are not faulty, and so the CPU 10 issues a faulty HDD disconnect instruction to the DEI bus from the RSP 34. This disconnect instruction is received by the DEI control circuit 62, and then is notified to the ESP 61. As a result, the ESP 61 acts in concert with the CPU 10 to execute disconnect processing of the faulty HDD using the DEI bus. This is explained in FIG. 6 through FIG. 8.

Figure 6:
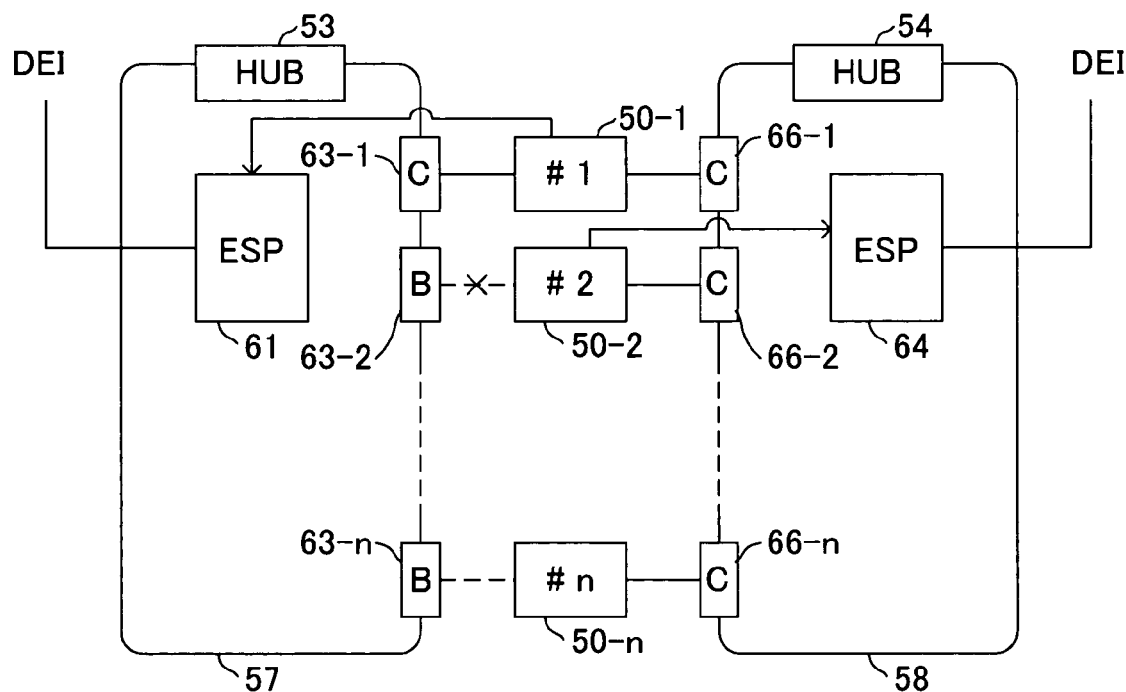
FIG. 6 is a drawing explaining the first step of faulty port search operation in FIG. 4.
Figure 7:
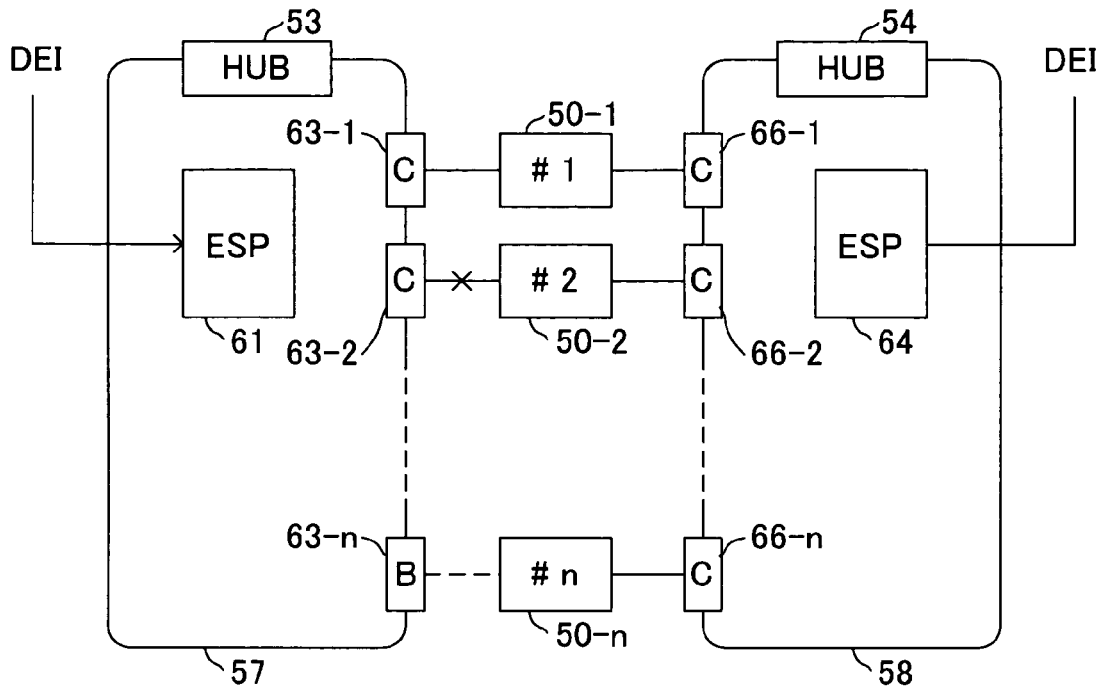
FIG. 7 is a drawing explaining the second step of faulty port search operation in FIG. 4.
Figure 8:
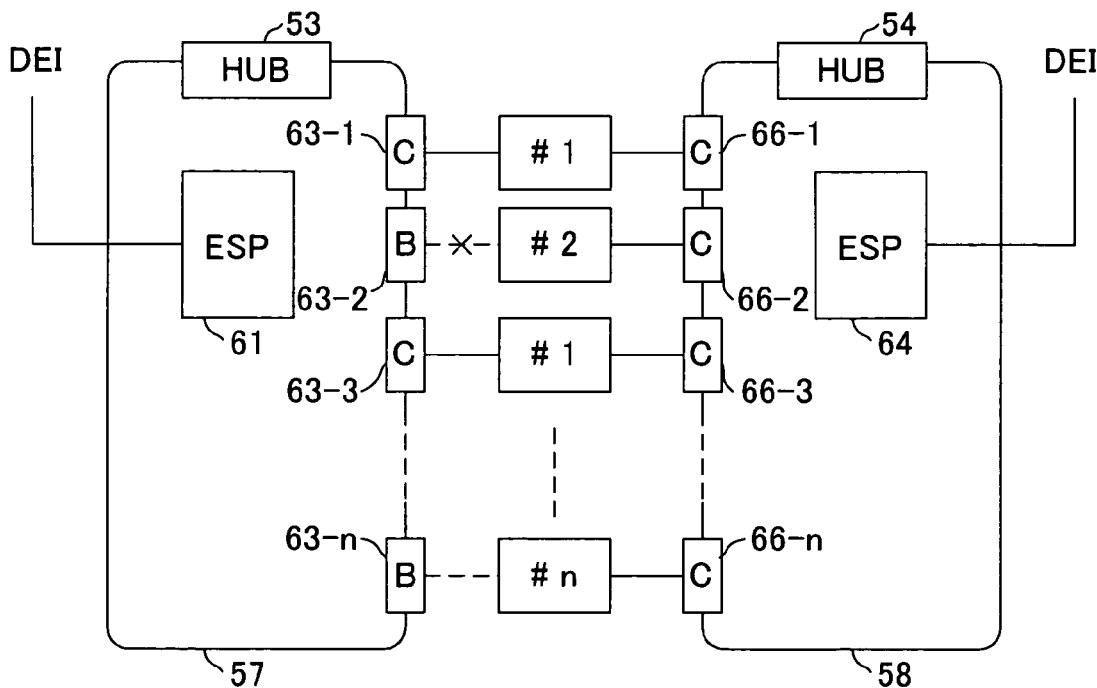
FIG. 8 is a drawing explaining the third step of faulty port search operation in FIG. 4.

The ESP 61 first connects the switch 63-1 on the port a side of the first HDD 50-1 to port a of the HDD 50-1 as in FIG. 6, and then CPU 10 issues a HDD 50-1 connection verification signal from the DA 13 to the hub 53 of the FC_AL 57, and verifies that a response is returned from the FC_AL 57 via the DA 13. That is, connection of the HDD 50-1 is verified. In FIG. 6 through FIG. 8, the connection state is indicated by "C" for each of the switches 63-1 to 63-n and is indicated by a solid line for the port a.

If normal connection is verified, the CPU 10 issues a connection instruction for the next HDD 50-2, to the ESP 61 via the DEI bus; the ESP 61 connects the switch 63-2 on the port a side of the second HDD 50-2 to port a of the HDD 50-2, as in FIG. 7; then the CPU 10 issues an HDD 50-2 connection verification signal from the DA 13 to the hub 53 of the FC_AL 57, and verifies that a response is returned from the FC_AL 57 via the DA 13. That is, connection of the HDD 50-2 is verified. In this example, port a of the HDD 50-2 is abnormal, so that no response is returned.

When a connection abnormality is detected, the CPU 10 issues to the ESP 61, via the DEI bus, an instruction to disconnect this HDD 50-2, and issues an instruction to connect the next HDD 50-3. The ESP 61 switches the switch 63-2 on the port a side of the second HDD 50-2 from the HDD 50-2 port a to bypass, as shown in FIG. 8. Moreover, the switch 63-3 of the HDD 50-3 is connected to port a of the HDD 50-3, and the CPU 10 then issues a HDD 50-3 connection verification signal from the DA 13 to the hub 53 of the FC_AL 57, and verifies that a response is returned from the FC_AL 57 via the DA 13. That is, connection of the HDD 50-3 is confirmed. Subsequently, similar processing is repeated up to HDD 50-n, faulty HDDs are disconnected from the FC_AL 57, and processing ends.

(S18) In step S14, when the FC_AL 57 loop bypass is not verified, it is determined that a DEI bus fault is occurred, and the CPU 10 issues a bypass instruction for all switches of FC_AL 57 from the DA 23 on the side of controller 2 to the ESP 61, via FC_AL 58, port b of the HDD 50-1, and the ESI of HDD 50-1. The ESP 61 switches all the FC_AL connection switches 63-1 to 63-n of the FC_AL 57 to the bypass state, similarly to FIG. 5.

Next, the CPU 10 issues a bypass verification signal from the DA 13 to the hub 53 of the FC_AL 57, and verifies that the signal is returned from the FC_AL 57 via the DA 13. That is, the loop bypass is verified. If the loop bypass state is not verified, then there are abnormalities in both the DEI route and the ESI route, so that disconnect is not possible, and processing ends with an error. If bypass is not possible using the ESI route of the HDD 50-1, then a retry is similarly performed using the ESI route of the HDD 50-3.

(S20) If bypass using the ESI route succeeds, the CPU 10 operates the ESP 61 to execute disconnect processing using the ESI route. Except for the fact that the ESI route is used, this processing is the same as in step S16, and is explained by FIG. 6 through FIG. 8.

The CPU 10 issues a connection instruction for the switch 63-1 on the side of port a of the first HDD 50-1 to the ESP 61 from the DA 23 on the side of controller 2, via the FC_AL 58, port b of the HDD 50-1, and the ESI of the HDD 50-1. By this means, the ESP 61 connects the switch 63-1 to port a of the HDD 50-1, as in FIG. 6, and then the CPU 10 issues a HDD 50-1 connection verification signal from the DA 13 to the hub 53 of the FC_AL 57, and verifies that a response is returned. In other words, HDD 50-1 connection is verified. In FIG. 6 through FIG. 8, the connection state is indicated by "C" for each of the switches 63-1 to 63-n and is indicated by a solid line for the port a.

If normal connection is verified, the CPU 10 issues an instruction connection for the next HDD 50-2 from the DA 23 on the side of the controller 2 to the ESP 61, via the FC_AL 58, port b of the HDD 50-1, and the ESI of the HDD 50-1. The ESP 61 connects the switch 63-2 on the side of port a of the second HDD 50-2 to port a of the HDD 50-2 as in FIG. 7, and then the CPU 10 issues a HDD 50-2 connection verification signal from the DA 13 to the hub 53 of the FC_AL 57, and verifies that a response is returned from the FC_AL 57 via the DA 13. That is, connection of the HDD 50-2 is verified. In this example, port a of the HDD 50-2 is abnormal, and so no response is returned.

When a connection abnormality is detected, the CPU 10 issues a disconnect instruction for this HDD 50-2 and a connect instruction for the next HDD 50-3 to the ESP 61 from the DA 23 on the side of the controller 2 via the FC_AL 58, port b of HDD 50-1, and ESI of HDD 50-1. The ESP 61 switches the switch 63-2 on the side of port a of the second HDD 50-2 from port a of HDD 50-2 to bypass, as in FIG. 8. The switch 63-3 of HDD 50-3 is connected to port a of the HDD 50-3, and the CPU 10 then issues a HDD 50-3 connection verification signal from the DA 13 to the hub 53 of the FC_AL 57, and verifies that a response is returned from the FC_AL 57 via the DA 13. That is, HDD 50-3 connection is verified. Subsequently, similar processing is repeated up to HDD 50-n, faulty HDDs are disconnected from the FC_AL 57, and processing ends.

By similarly performing steps S10 to S20 for the FC_AL connection switches 66-1 to 66-n of the FC_AL 58 with respect to abnormalities at ports b of the HDDs 50-1 to 50-n, a DEI route and ESI route can be used in conjunction to disconnect faulty HDDs from the FC_AL 58.

Figure 9:
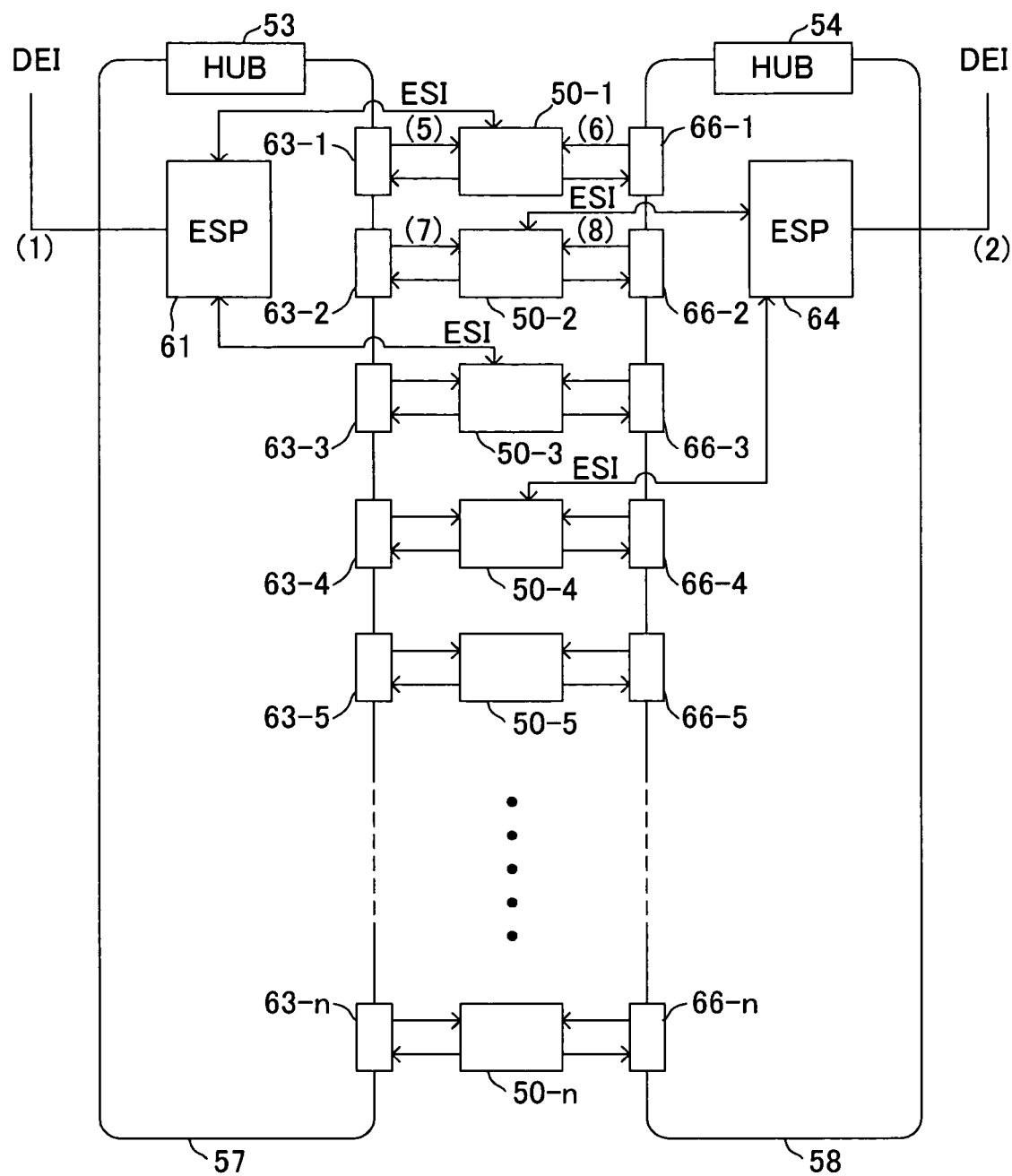
FIG. 9 is a drawing explaining the fault location in the faulty port disconnect operation of FIG. 4.
Figure 11:
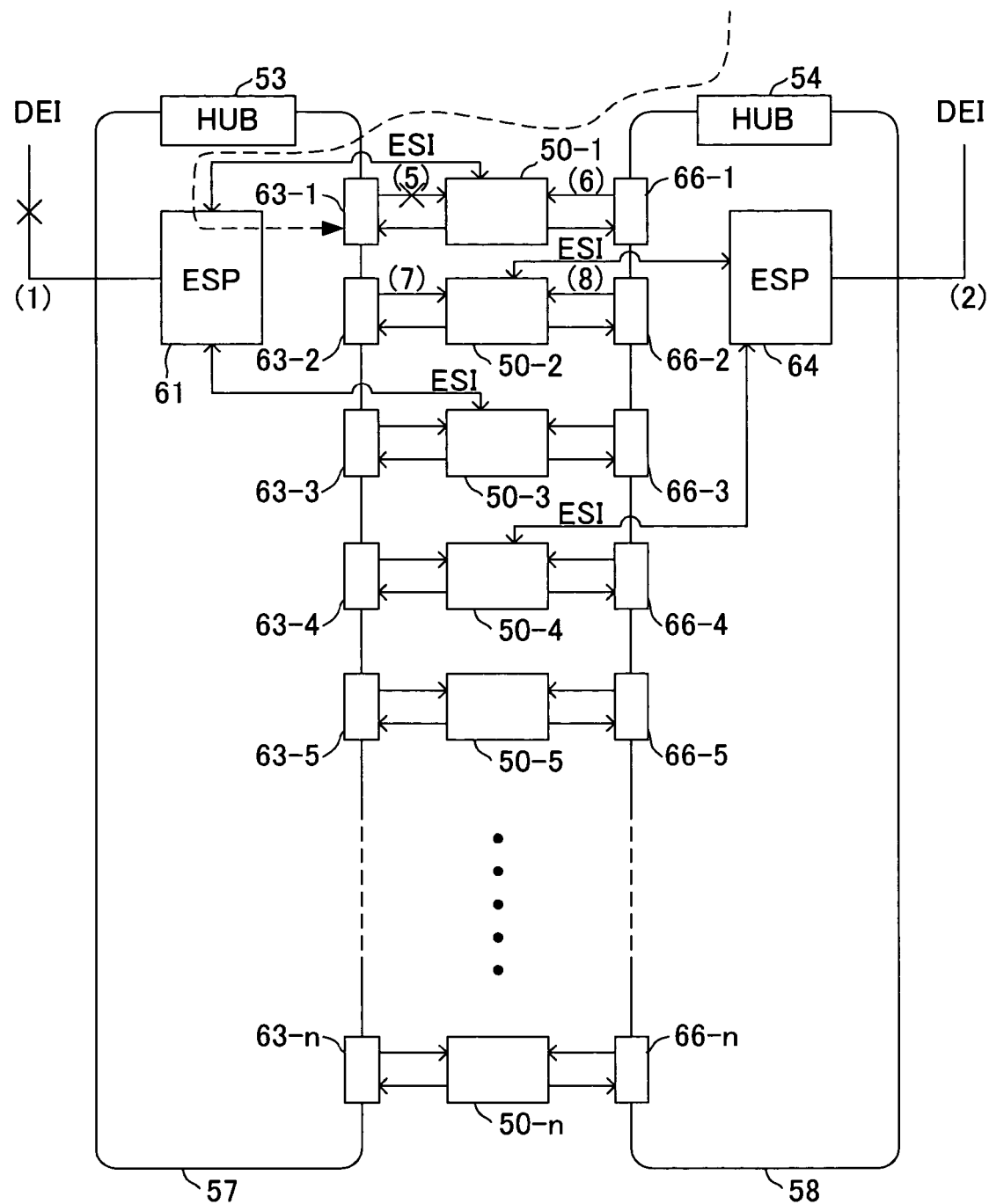
FIG. 11 is a drawing of disconnect operation in fault case B of FIG. 10.
Figure 12:
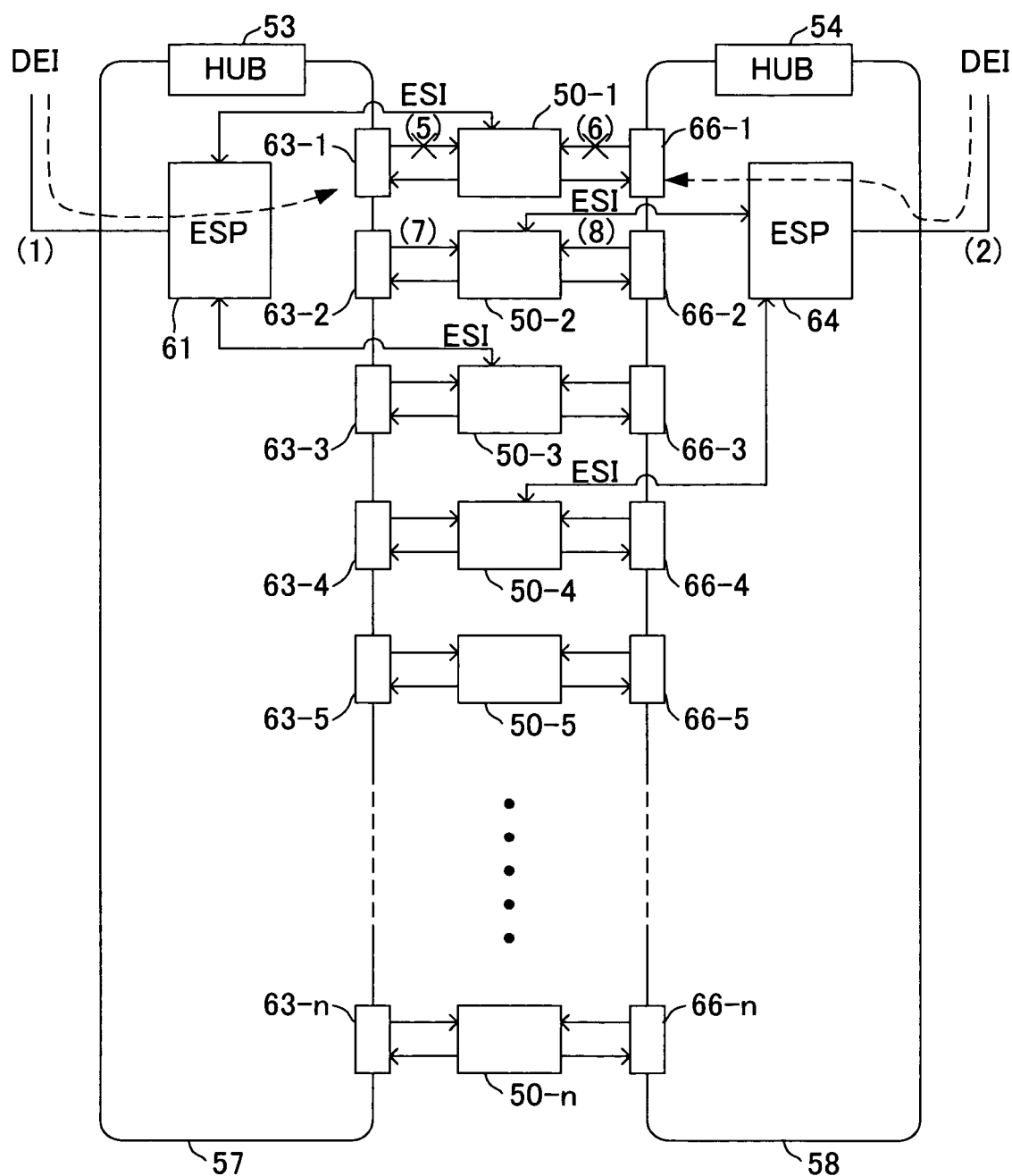
FIG. 12 is a drawing of disconnect operation in fault case C of FIG. 10.
Figure 13:
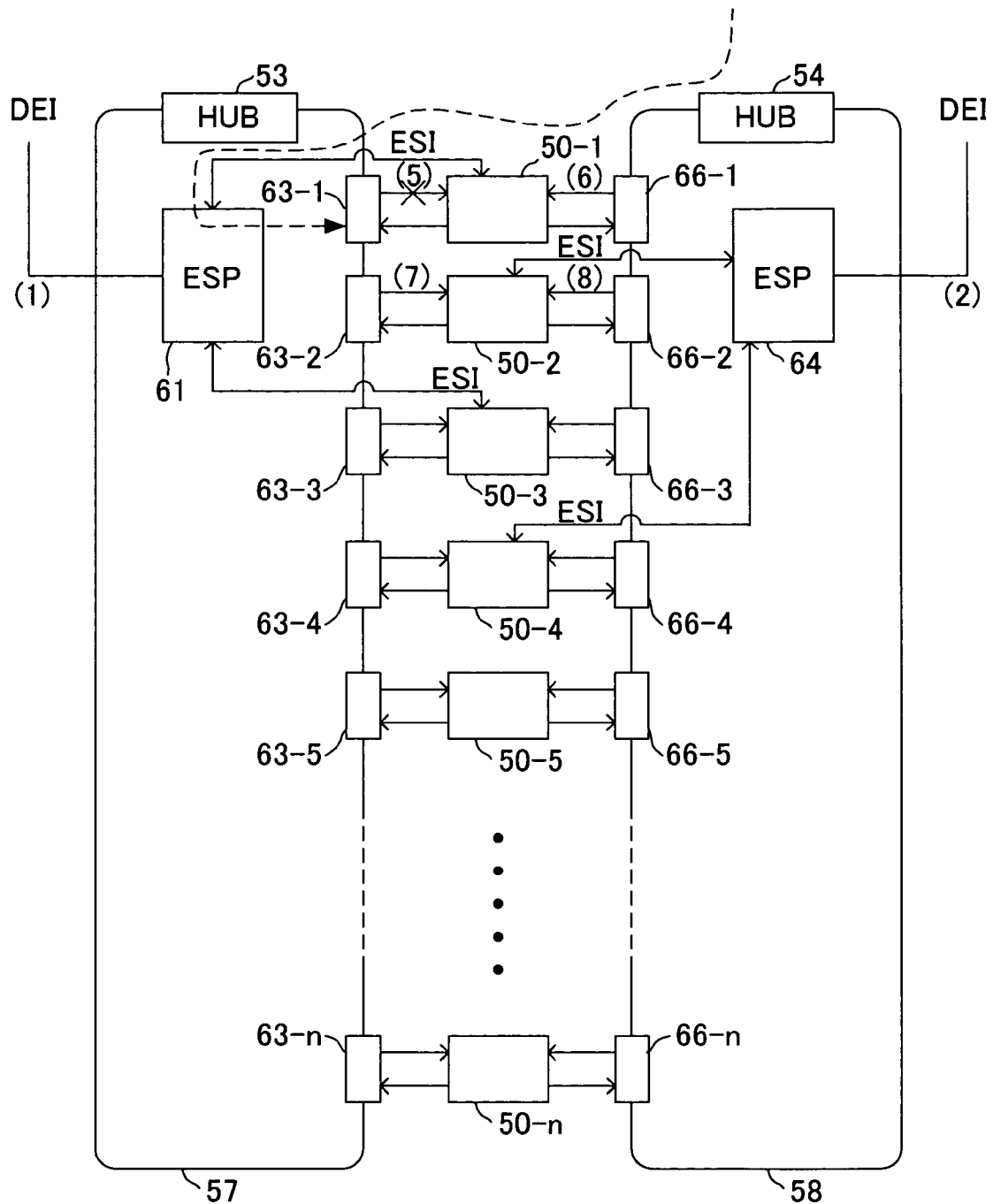
FIG. 13 is a drawing of disconnect operation in fault case A of FIG. 10.

The action and advantageous results of this invention are explained using FIG. 9 through FIG. 13. FIG. 9 illustrates fault locations (1) through (8) in the configuration of FIG. 3. FIG. 10 is a diagram of correspondence relations between fault locations of FIG. 9 and switch disconnect control routes, and FIG. 11 through FIG. 13 are drawings explaining the operation thereof.

Referring to FIG. 10, in case A when there is a fault in a port on only one side of the magnetic disk drives 50-1 or 50-2 (the case in which there is a fault at only one location among (5), (7), (6), and (8)), disconnect can be performed using the ESI route or a DEI route, as shown in FIG. 13. In the embodiment of FIG. 4, disconnect is performed using a DEI route.

In case B, when there are faults in the ports on both sides of the magnetic disk drives 50-1 and 50-2 (the case in which there are faults at two locations, either (5) and (6), or (7) and (8), or (5) and (8), or (6) and (7)), disconnect can be performed using a DEI route, as shown in FIG. 12.

In case C, when there is a fault in one of the DEI buses ((1) or (2)) or in both buses ((1) and (2)) as well as a fault in a port on only one side of the magnetic disk drives 50-1 or 50-2 (when there is a fault at any one location among (5), (7), (6), or (8)), disconnect can be performed using the ESI route, as shown in FIG. 11.

When there are faults in both DEI buses and also in ports on both sides of the magnetic disk devices 50-1 and 50-2, disconnect is not possible using either an ESI route or a DEI route.

In this way, by using DEI routes and ESI routes in conjunction as disconnect routes, disconnect can be performed using a DEI route in case C, in which disconnect is not possible employing the first conventional technology using an ESI route. Further, disconnect can be performed using an ESI route in case B, in which disconnect is not possible employing the second conventional technology.

Further, in this embodiment a disconnect attempt is made using a DEI route, and if successful, disconnect is possible in cases A and C, but if unsuccessful, disconnect control is performed using an ESI route; hence in the majority of cases, disconnect control is possible using only one controller. And because detection is performed at the stage of FC_AL bypass switching, early switching from a DEI route to an ESI route is possible.

Other Disconnect Control

Figure 14:
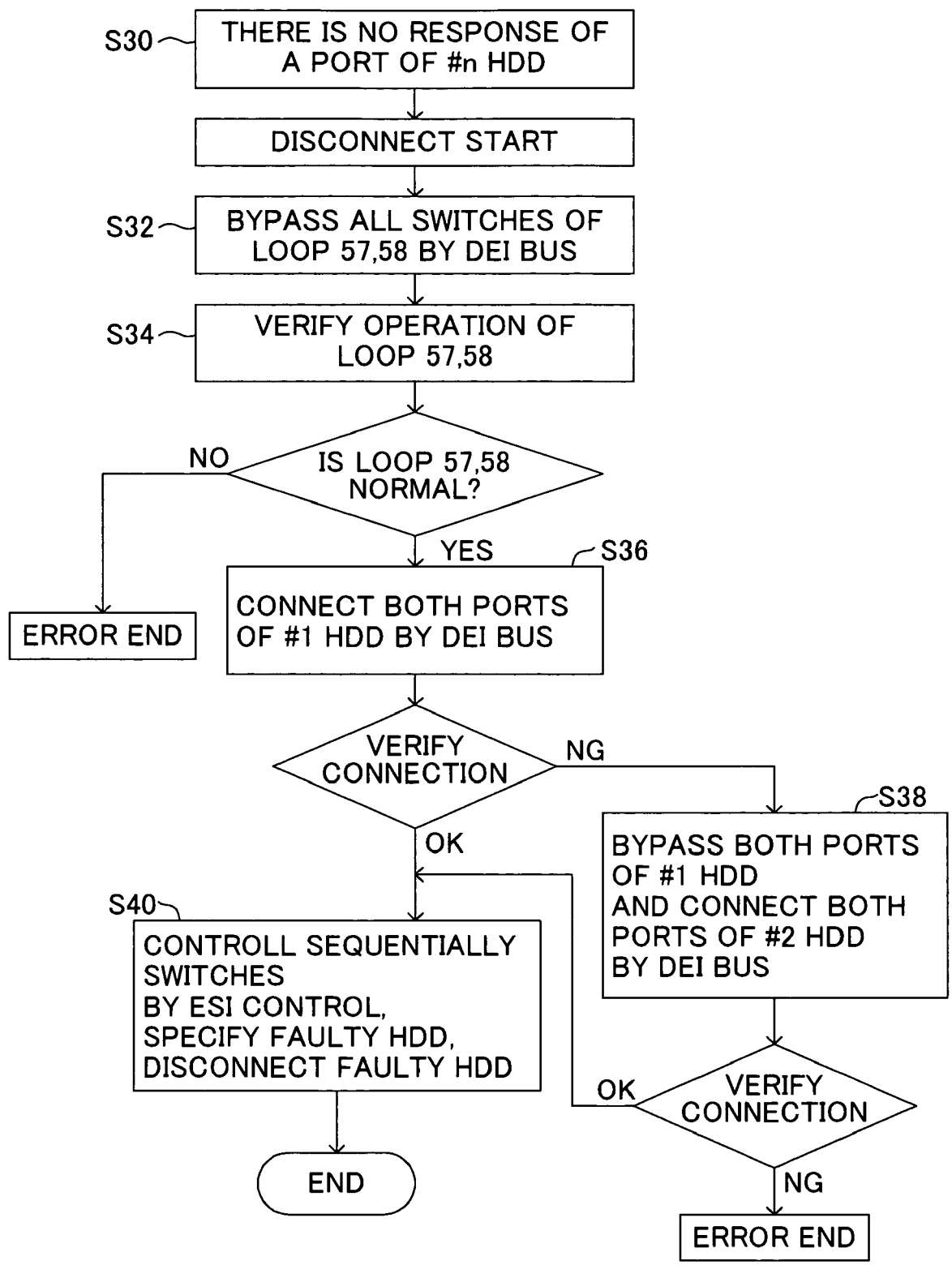
FIG. 14 is a diagram of the disconnect processing flow in another embodiment of this invention.
Figure 15:
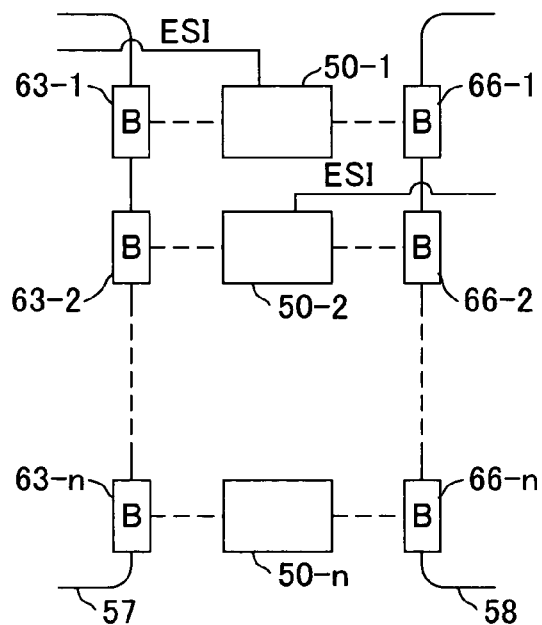
FIG. 15 is a drawing explaining a loop bypass state in FIG. 14.
Figure 16:
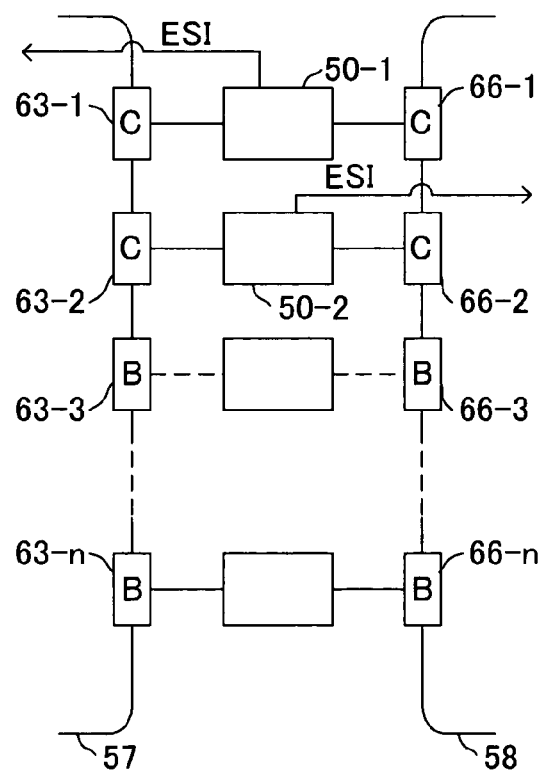
FIG. 16 is a drawing explaining faulty port searching and disconnecting operation in FIG. 14.

FIG. 14 is a diagram of the disconnect control flow in another embodiment of this invention; FIG. 15 and FIG. 16 are explanatory drawings thereof. In this embodiment, loop bypass is performed using a DEI route; when loop bypass using a DEI route fails, loop bypass is performed using an ESI route, and the faulty HDD is disconnected; when loop bypass using a DEI route succeeds, disconnect using ESI is possible, and so after connecting the HDD having an ESI to the DEI route, disconnect is performed using the ESI route.

(S30) Similarly to step S10 in FIG. 4, when there is no response for HDD #n, disconnect is initiated.

(S32) Next, in processing similar to that of step S12, the DEI bus is used to switch all the FC_AL 57, 58 switches to bypass.

(S34) Then, in processing similar to that of step S14, operation of both FC_ALs 57 and 58 is verified, and a judgment as to whether loops are normal is made. If not normal, a DEI bus fault or FC_AL fault is detected, and processing ends with an error.

(S36) If the loops are normal, all the magnetic disk drives 50-1 to 50-n are disconnected from both FC_ALs 57, 58, as in FIG. 15. In this state, disconnect using the ESI is not possible. Hence similarly to S16 in FIG. 4, the DEI bus is used to connect both ports of the HDD 50-1, and normal connection is verified.

(S38) If the connection is abnormal, then similarly to step S16 in FIG. 4, the DEI bus is used to bypass both ports of the HDD 50-1, and similarly to step S16 in FIG. 4, the DEI bus is used to connect both ports of the next HDD 50-2; normal connection is then verified. If the connection is abnormal, this processing is repeated up to HDD 50-4 having an ESI, and if the connections are all abnormal, processing ends with an error.

(S40) If the connections are normal, ESI control can be used to perform disconnect, as shown in FIG. 16, and so similarly to step S20 in FIG. 4, ESI control is used to control the subsequent HDD switches in order, identify the faulty HDD, and disconnect same. Then processing ends.

In this example, fault location case B in FIG. 10 cannot be removed, but rapid disconnect of the faulty HDD is possible. That is, DEI control uses the low-speed DEI bus for state monitoring, so that if the DEI route is used for disconnect, as in FIG. 4, more time is required. On the other hand, disconnect using the ESI route employs the high-speed FC_AL, so that disconnect under ESI control can be performed rapidly.

Further, disconnect can be performed more rapidly if disconnect control is executed after both ports have been bypassed. Hence the DEI route is used to bypass both FC_AL, and then an HDD having an ESI is connected to a FC_AL, enabling high-speed disconnect using the ESI route.

Figure 17:
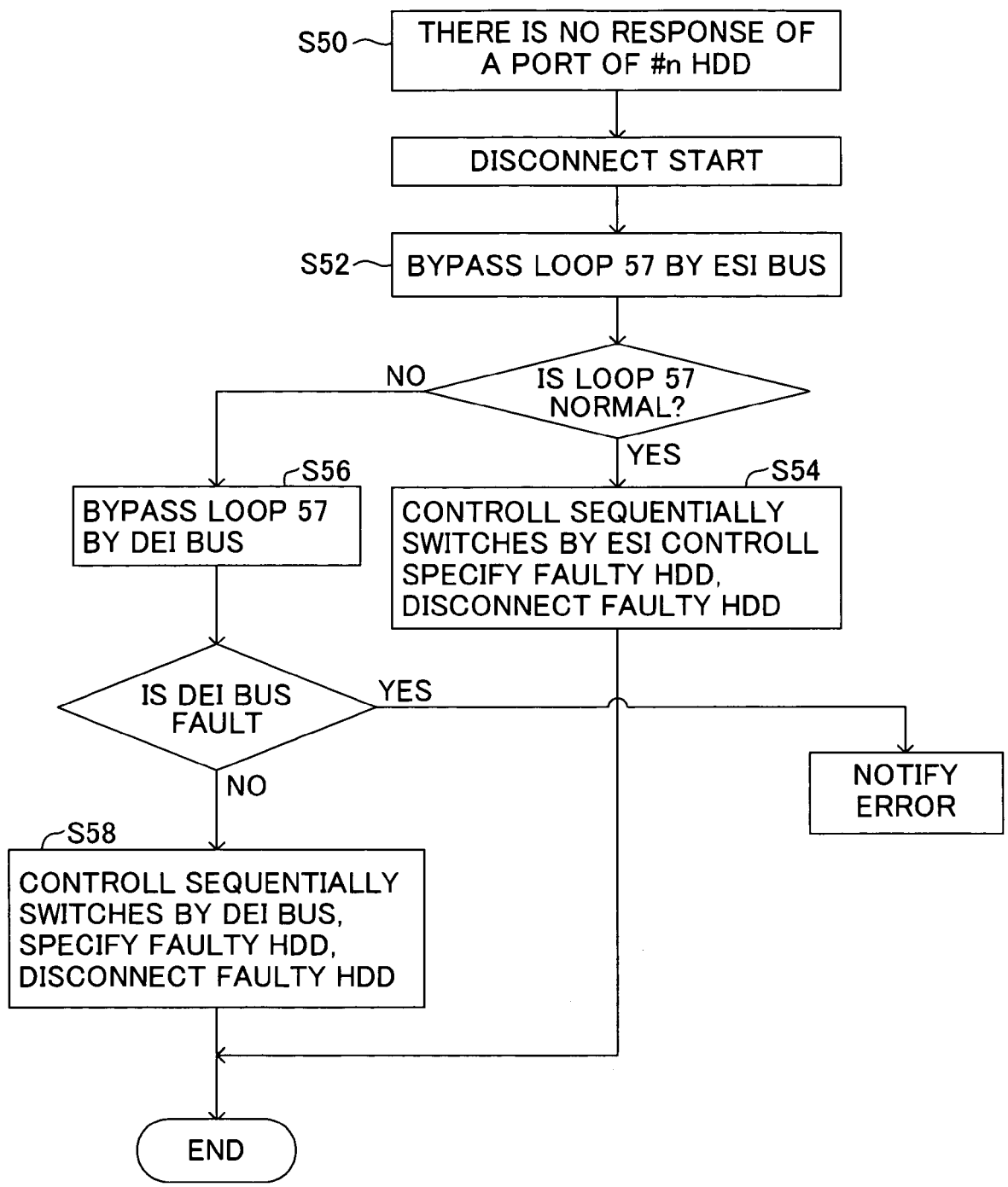
FIG. 17 is a diagram of the disconnect processing flow in still another embodiment of this invention.

FIG. 17 is a diagram of the disconnect control flow in still another embodiment of this invention. In this embodiment, the order of DEI control and ESI control is opposite that of the embodiment of FIG. 4.

(S50) Similarly to step S10 in FIG. 4, there is no response from port a of HDD #n, and so disconnect is initiated.

(S52) Similarly to step S18 in FIG. 4, the ESI route is, used to bypass all switches of FC_AL 57, and loop operation is verified.

(S54) If loop operation is normal, ESI control is possible, and so similarly to step S20 in FIG. 4, ESI control is used to control the HDD switches in order, identify the faulty HDD, and disconnect same. Then processing ends.

(S56) If loop operation is abnormal, similarly to steps S12 and S14 in FIG. 4, the DEI route is used to bypass all switches of FC_AL 57, and loop operation is verified. If loop operation is abnormal, processing ends with an error.

(S58) If loop operation is normal, similarly to step S16 in FIG. 4, the DEI loop is used to control the HDD switches in order, identify the faulty HDD, and disconnect same. Then processing ends.

In this example also, action and advantageous results similar to those of the embodiment of FIG. 4 are obtained.

That is, disconnect is possible in the fault cases A, B, and C of FIG. 10.

ANOTHER EMBODIMENT

Figure 18:
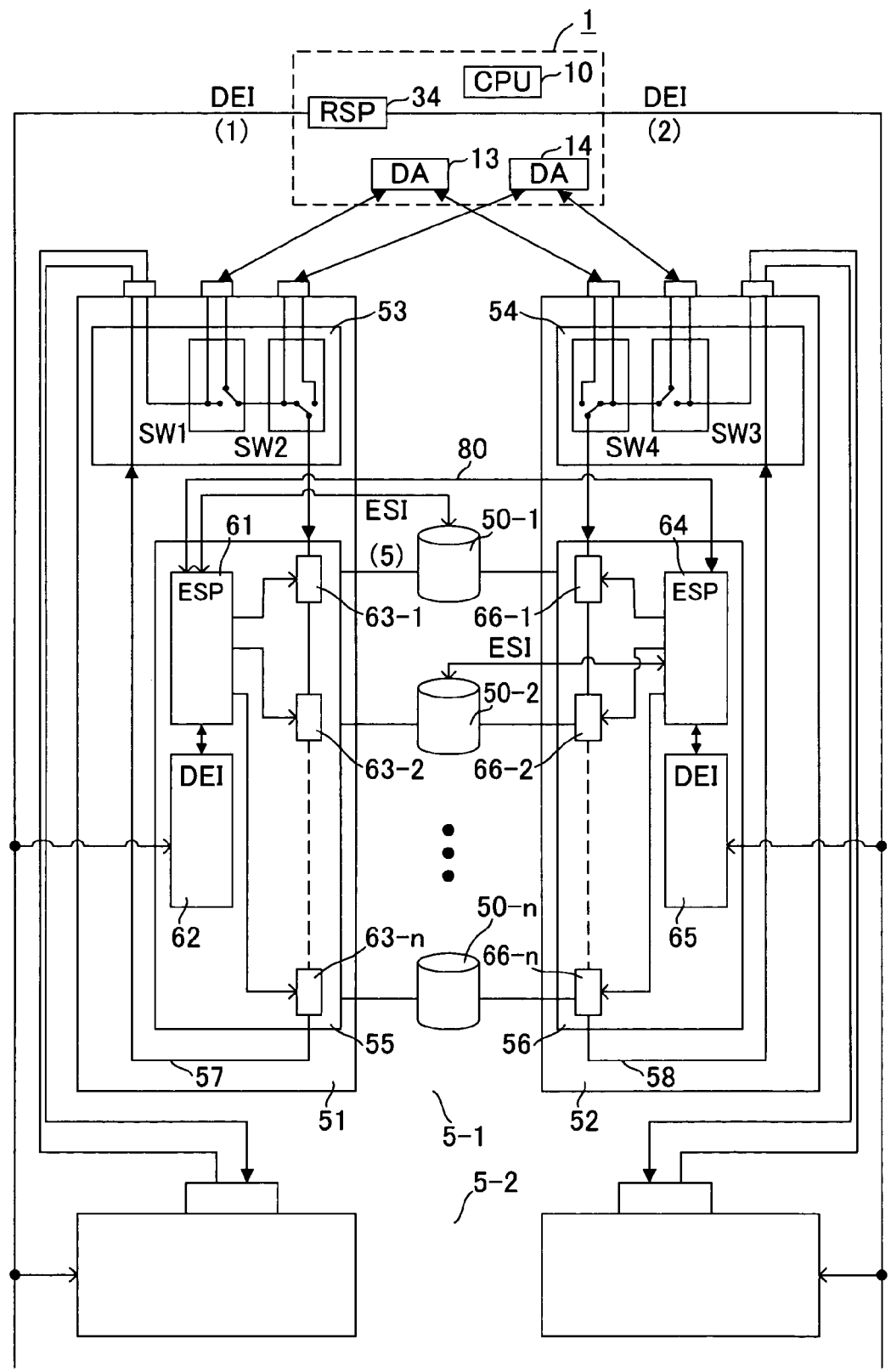
FIG. 18 is a drawing of the configuration of the storage system in another embodiment of this invention.
Figure 19:
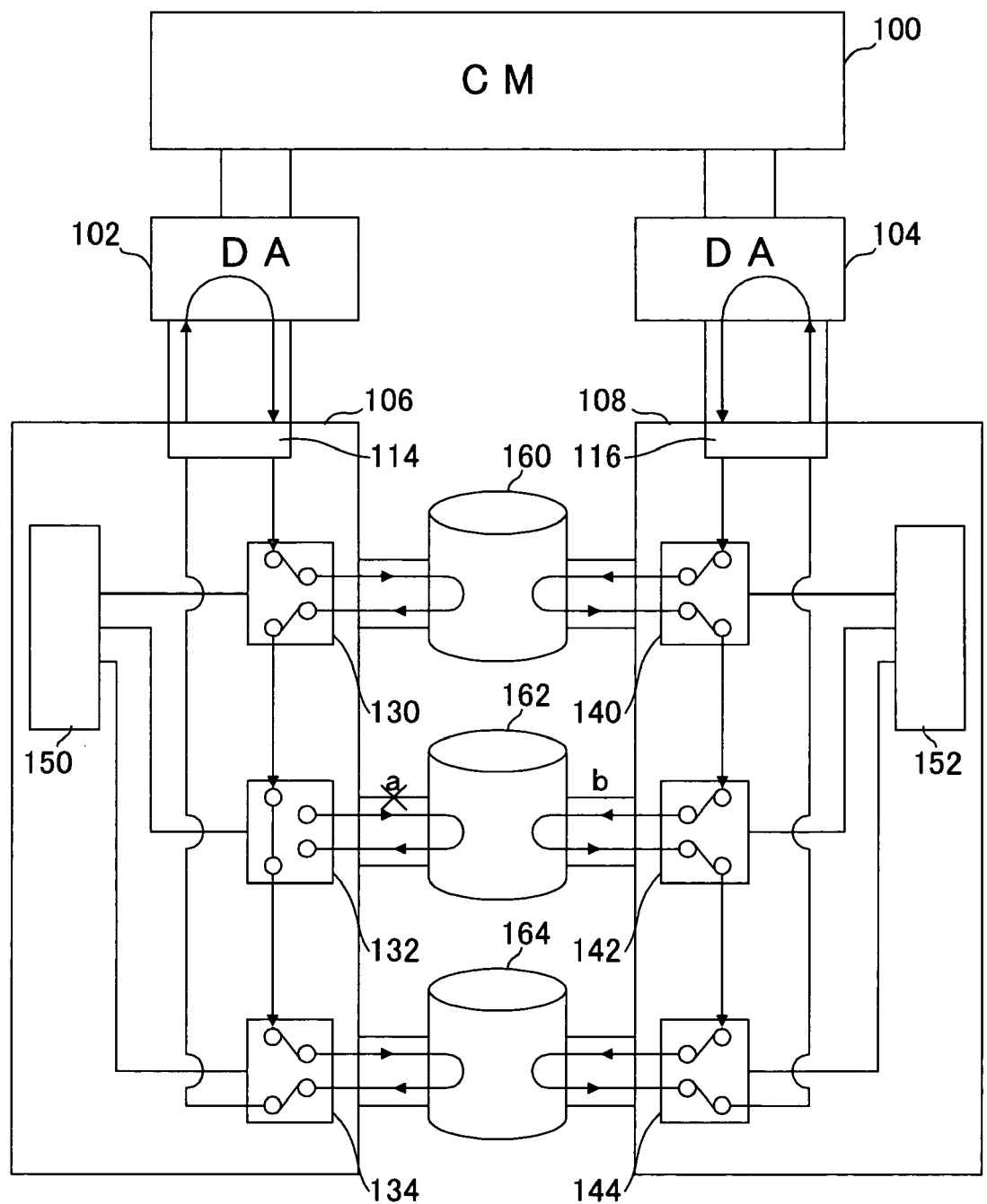
FIG. 19 is a drawing explaining disconnect control in a first technology of the prior art; and, FIG. 20 is a drawing explaining disconnect control in a second technology of the prior art.
Figure 20:
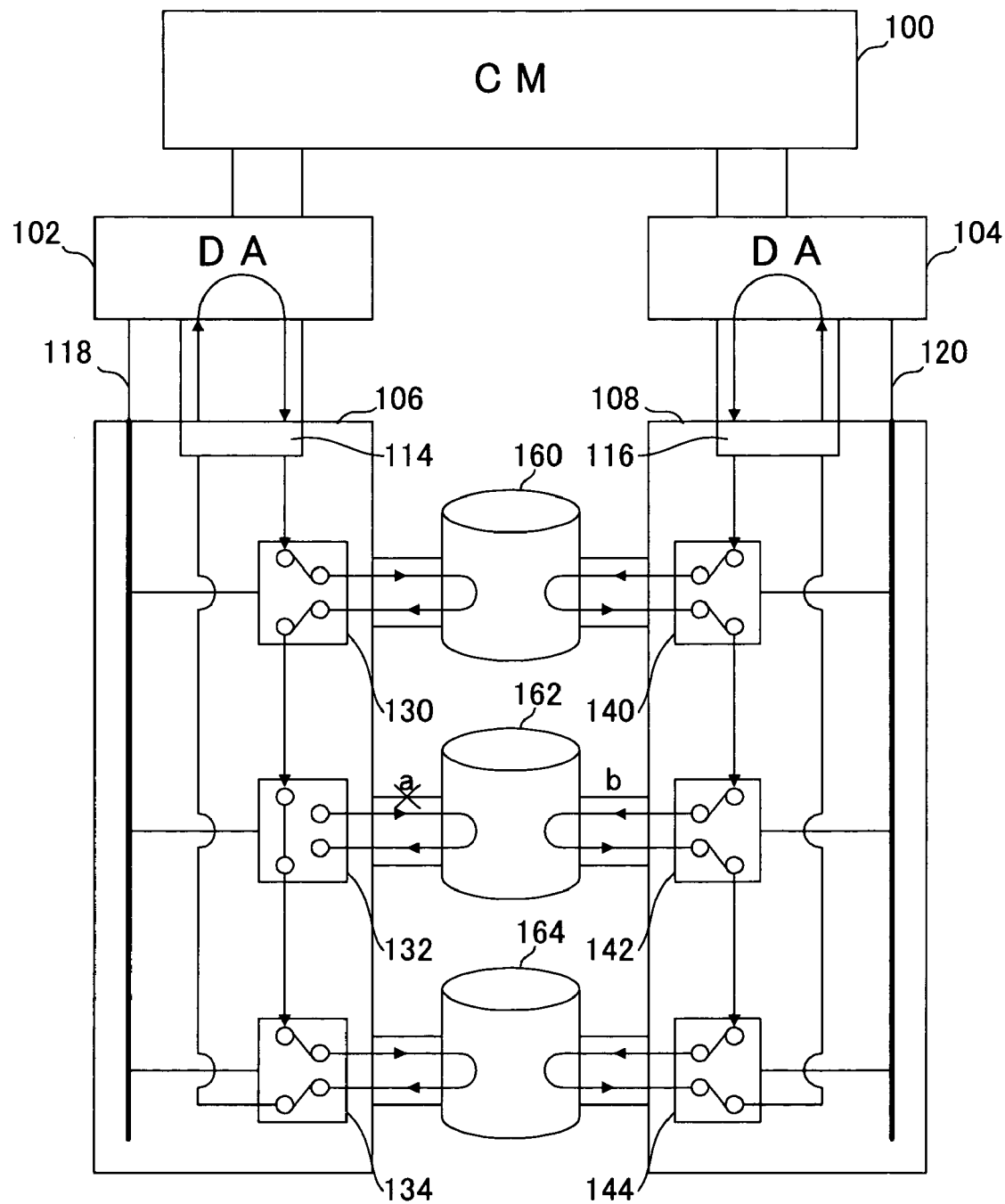

FIG. 18 is a drawing of the configuration of the storage system in another embodiment of this invention, and is an example of a variation on the configuration of FIG. 2. In FIG. 18, items which are the same as in FIG. 2 are assigned the same symbols; in this example, a single controller 1 is provided.

In this case, a connection bus 80, which connects the ESP 61 of the PBC module 51 and the ESP 64 of the PBC module 52, is provided. By this means, even if either of the DEI buses (1) or (2) is abnormal, DEI control is possible from the normal DEI bus (2) or (1), using as a route the ESP 64, connection bus 80, and ESP 61, or the ESP 61, connection bus 80, and ESP 64. Hence there is even greater freedom in performing disconnect.

This connection bus 80 connecting the ESP 61 of the PBC module 51 and the ESP 64 of the PBC module 52 is also illustrated in the example of the two controllers 1, 2 of FIG. 2. Hence similarly to the case of the two controllers 1, 2, even if either of the DEI buses (1) or (2) is abnormal, the normal DEI bus (2) or (1) can be used in DEI control, using as a route either the ESP 64, connection bus 80 and ESP 61, or the ESP 61, connection bus 80 and ESP 64. Hence there is even greater freedom in performing disconnect.

In the previously described embodiments, the case of a RAID redundant configuration such as in FIG. 1 was explained; however, application to storage systems with other redundant configurations is also possible. Moreover, application to various storage devices, including magnetic disks, optical disks and magneto-optical disks, is possible.

Further, in the previously described embodiments, when there is no response from a certain HDD, disconnect processing is initiated; however, during diagnostics, power supply turn-on and at other times, a diagnostic sequence may be executed instead.

In the above, embodiments of this invention have been explained; however, various modifications are possible within the scope of this invention, and the above embodiments do not exclude such modifications from the scope of this invention.

In this way, in this invention a first disconnect mode, in which a disconnect instruction is issued to a device control portion via a first path connecting a controller and the device control portion, and a second disconnect mode, in which a disconnect instruction is issued to a device control portion via a second path connecting a loop, which connects a plurality of storage devices, a storage device, and a device control portion, are used in conjunction to disconnect a faulty storage device from the above loop. Hence even if a pair of connection ports of a storage device are abnormal, and even if the first path is abnormal, the faulty storage device can be reliably disconnected.

Further, disconnect can be performed using the low-speed first path or the high-speed second path, so that even in a large-capacity storage system in which numerous (for example, over one hundred) storage devices are connected, rapid disconnect control is possible.

What is claimed is:

1. A storage system which accesses a plurality of storage devices in response to data access requests from a request device, comprising:

a plurality of storage devices;

at least one controller which controls said plurality of storage devices;

a pair of loops, in which information circulates in a single direction, for exchanging information among said controller and said plurality of storage devices;

a plurality of first switches, provided in one of said loops, to connect one of said pair of loops to said plurality of storage devices;

a plurality of second switches, provided in another one of said loops, to connect said another one of said pair of loops to said plurality of storage devices;

a first device control unit, connected by a first path to said controller and connected by a second path to said storage devices, and which operates said plurality of first switches; and a second device control unit, connected by a third path to said controller and connected by a fourth path to said storage devices, and which operates said plurality of second switches, said first, second, third and fourth paths comprising physical paths separated from said pair of loops, wherein said controller has a first disconnect mode for issuing a disconnect instruction to any one of said first and second device control units via said first path or said third path; and a second disconnect mode for issuing a disconnect instruction to any one of said first and second device control units via any one of said pair of loops, said storage device, and said second path or said fourth path, and wherein said controller executes one of said first disconnect mode and said second disconnect mode when detecting a fault of the storage device from a response when accessing said storage device through said one of said loops, and executes another of said first disconnect mode and said second disconnect mode when detecting a faulty disconnect of said faulty storage device by executing said one of said first disconnect mode and said second disconnect mode.

2. The storage system according to claim 1, wherein said controller comprises;

a channel circuit to control the interface with said request device;

a device circuit, which exchanges information with said storage devices via said pair of loops;

a central control unit, to control said channel circuit and said device circuit, and to access said storage devices in response to data access requests from said request device; and a service processor, connected to said central control unit, and which is connected to said first and second device control units by said first and third paths.

3. The storage system according to claim 2, wherein said first and second device control units monitor the states of said plurality of storage devices, and use said first and third paths to notify said service processor of the results.

4. The storage system according to claim 1, wherein said controller comprises a pair of said controllers, and each of said controllers accesses said storage devices via said pair of loops.

5. The storage system according to claim 1, wherein a further comprising a fifth path connecting said first and second device control units, and for exchanging said disconnect instructions between said first and second device control units.

6. A storage system which accesses a plurality of storage devices in response to data access requests from a request device, comprising:

a plurality of storage devices;

at least one controller which controls said plurality of storage devices;

a pair of loops, in which information circulates in a single direction, for exchanging information among said controller and said plurality of storage devices;

a plurality of first switches, provided in one of said loops, to connect one of said pair of loops to said plurality of storage devices;

a plurality of second switches, provided in another one of said loops, to connect another one of said pair of loops to said plurality of storage devices;

a first device control unit, connected by a first path to said controller and connected by a second path to said storage devices, and which operate said plurality of first switches; and a second device control unit, connected by a third path to said controller and connected by a fourth path to said storage devices, and which operate said plurality of second switches.

said first, second, third and fourth paths comprising physical paths separated from said pair of loops, wherein said controller has a first disconnect mode for issuing a disconnect instruction to any one of said first and second device control units via said first path or said third path; and a second disconnect mode for issuing a disconnect instruction to any one of said first and second device control units via any one of said pair of loops, said storage device, and said second path or said fourth path, wherein said controller switches all first or second switches in said one of a pair of loops into a bypass state and switches the switches of said storage devices having said second path to said one loop into a connection state by executing said first disconnect mode when detecting the fault of the storage device from a response when accessing said storage device through said one of loops, and then identifies said faulty storage device and bypasses said faulty storage device from said loop by executing said second disconnect mode.

7. The storage system according to claim 6, wherein said controller comprises:

a channel circuit to control the interface with said request device;

a device circuit, which exchanges information with said storage devices via said pair of loops;

a central control unit, to control said channel circuit and said device circuit, and to access said storage devices in response to data access requests from said request device; and a service processor, connected to said central control unit, and which is connected to said first and second device control units by said first and third paths, wherein said first and second device control units monitor the states of said plurality of storage devices, and use said first and third paths to notify said service processor of the results.

8. The storage system according to claim 6, further comprising a fifth path connecting said first and second device control units for exchanging said disconnect instructions between said first and second device control units.

9. A faulty storage device disconnecting method for disconnecting a faulty storage device in a storage system in which a plurality of storage devices connected by a pair of loops are accessed in response to data access requests from a request device, comprising the steps of:

issuing a disconnect instruction from a controller to a first device control unit for operating a plurality of first switches to connect said plurality of storage devices to one of said pair of loops when detecting a fault of said one of said pair of loops; and issuing a disconnect instruction from said controller to a second device control unit for operating a plurality of second switches to connect said plurality of storage devices to another one of said pair of loops when detecting a fault of said another one of said pair of loops; and disconnecting a faulty storage device from said loops by using a first disconnect mode, in which said disconnect instruction is issued to said first device control unit via a first path connecting said controller and said first device control unit, and a second disconnect mode, in which said disconnect instruction is issued to said first device control unit via said another one of said loops, said storage device, and a second path connecting said storage devices and said first device control unit, wherein said disconnecting step comprises the steps of:

executing one of said first disconnect mode and said second disconnect mode when detecting the fault of the storage device from a response when accessing said storage device through said one of loops; and executing another of said first disconnect mode and said second disconnect mode when detecting a faulty disconnect of said faulty storage device by executing said one of said first disconnect mode and said second disconnect mode.

10. The faulty storage device disconnecting method according to claim 9, wherein said disconnect in said first disconnect mode is executed by controlling a channel circuit to control the interface with said request device and a device circuit to exchange information with said storage devices via said pair of loops, via said device circuit, by a central control unit to access said storage devices in response to data access requests from said request device; and said disconnect in said second disconnect mode is executed via a service processor connected to said central control unit, and which is connected to said first and second device control units by said first and third paths.

11. The faulty storage device disconnecting method according to claim 10, further comprising:

a step of monitoring the states of said plurality of storage devices by said first and second device control units; and a step of using said first and third paths to notify said service processor of the results.

12. The faulty storage device disconnecting method according to claim 9, further comprising a step of accessing said storage devices via said pair of loops by each of a pair of said controllers.

13. The faulty storage device disconnecting method according to claim 9, further comprising a step of exchanging said disconnect instructions between said first and second device control units.

14. A faulty storage device disconnecting method for disconnecting a faulty storage device in a storage system in which a plurality of storage devices connected by a pair of loops are accessed in response to data access requests from a request device, comprising the steps of:

issuing a first disconnect instruction from a controller to a first device control unit for operating a plurality of first switches to connect said plurality of storage devices to one of said pair of loops when detecting a fault of said one of said pair of loops, and issuing a disconnect instruction from said controller to a second device control unit for operating a plurality of second switches to connect said plurality of storage devices to another one of said pair of loops when detecting a fault of said another one of said pair of loops; and disconnecting a faulty storage device from said loops by using a first disconnect mode, in which said first disconnect instruction is issued to said first device control unit via a first path connecting said controller and said first device control unit, and a second disconnect mode, in which said first disconnect instruction is issued to said first device control unit via said another one of said loops, said storage device, and a second path connecting said storage devices and said first device control unit, wherein said disconnecting step comprises the steps of:

a switching all first or second switches in said one of a pair of loops into a bypass state and moreover switching the switches of said storage devices having said second path to said one loop into a connection state by executing said first disconnect mode when detecting the fault of the storage device from a response when accessing said storage device through said one of loops; and identifying said faulty storage device and bypassing said faulty storage device from said loop by executing said second disconnect mode.

15. The faulty storage device disconnecting method according to claim 14, further comprising:

a step of monitoring the states of said plurality of storage devices by said device control unit; and a step of using said first path to notify a service processor in said controller of the results.

16. The faulty storage device disconnecting method according to claim 14, further comprising a step of exchanging said disconnect instructions between said first and second device control units.

* * * * *